United States Patent [19]

Shahidi-Hamedani et al.

[11] Patent Number: 5,165,187

[45] Date of Patent: Nov. 24, 1992

[54] EDGE ILLUMINATED SIGN PANEL

[75] Inventors: Ferrydon Shahidi-Hamedani; Joan Shahidi-Hamedani, both of Toronto, Canada

[73] Assignee: Fiber Sense & Signals Inc., Toronto, Canada

[21] Appl. No.: 8,747

[22] Filed: Jan. 30, 1987

[51] Int. Cl.$^5$ .................................. G09F 13/00
[52] U.S. Cl. ................................ 40/547; 385/901; 362/32
[58] Field of Search .............. 40/546, 547, 152.2, 40/580; 350/96.1, 96.2, 96.15, 96.24, 96.25, 96.27; 362/31, 32

[56] References Cited

U.S. PATENT DOCUMENTS

| | | | |
|---|---|---|---|
| 2,247,969 | 7/1941 | Stewart | 350/96.1 |
| 2,297,851 | 10/1942 | Wyss, Jr. | 350/96.1 |
| 2,354,367 | 7/1944 | Ford | 40/547 |
| 2,480,178 | 8/1949 | Zinberg | 350/96.1 |
| 2,507,909 | 5/1950 | Kaysen | 40/547 |
| 2,588,545 | 3/1952 | Lawrence | 40/152.2 |
| 2,639,528 | 5/1953 | Ochsner | 40/547 |
| 3,060,789 | 10/1962 | Hicks, Jr. | 350/96.27 |
| 3,489,482 | 1/1970 | Brill | 350/96.1 |
| 3,491,245 | 1/1970 | Hardesty | 40/546 |
| 3,546,438 | 12/1970 | Buc | 350/96.1 |
| 3,617,727 | 2/1971 | Balfour-Lynn | 362/32 |
| 3,781,537 | 12/1973 | Ramsey | 362/32 |
| 3,962,702 | 6/1976 | Kriege | 340/815.31 |
| 4,141,058 | 2/1979 | Mizohata et al. | 362/32 |
| 4,151,582 | 4/1979 | Grunberger | 350/96.1 |
| 4,422,719 | 12/1983 | Orcutt | 40/547 |
| 4,466,208 | 8/1984 | Logan, Jr. et al. | 40/580 |
| 4,519,017 | 5/1985 | Daniel | 362/32 |
| 4,597,030 | 6/1986 | Brody et al. | 362/32 |
| 4,647,152 | 3/1987 | Jeskey | 350/96.24 |
| 4,715,700 | 12/1987 | Daniel | 350/96.1 |

FOREIGN PATENT DOCUMENTS

| | | | |
|---|---|---|---|
| 494830 | 9/1950 | Belgium | 40/546 |
| 555010 | 3/1958 | Canada | 40/546 |
| 2359460 | 6/1974 | Fed. Rep. of Germany | 40/546 |
| 3509663 | 7/1985 | Fed. Rep. of Germany | 362/32 |
| 277177 | 8/1951 | Switzerland | 40/546 |
| 593054 | 10/1947 | United Kingdom | 40/546 |
| 1507883 | 4/1978 | United Kingdom | 40/547 |
| 2051447 | 1/1981 | United Kingdom | 40/547 |

Primary Examiner—Kenneth J. Dorner
Assistant Examiner—Brian K. Green

[57] ABSTRACT

Improved illumination of edge illuminated signs is achieved by use of light guides of transparent material to match the aperture of an edge of a sign panel to the aperture of a light source which may be located remotely. The light guide is typically of ribbon section at the panel end and of compact section at the other. It may be formed by dividing a continuation of one edge of the panel into individual fibres. The compact end of the guide may be fitted with a ferrule for coupling to further light guide elements. The sign panel is preferably covered with internally reflective or phosphorescent material except in the regions of indicia formed on the surface of the panel by masking, abrasion or hot stamping.

4 Claims, 2 Drawing Sheets

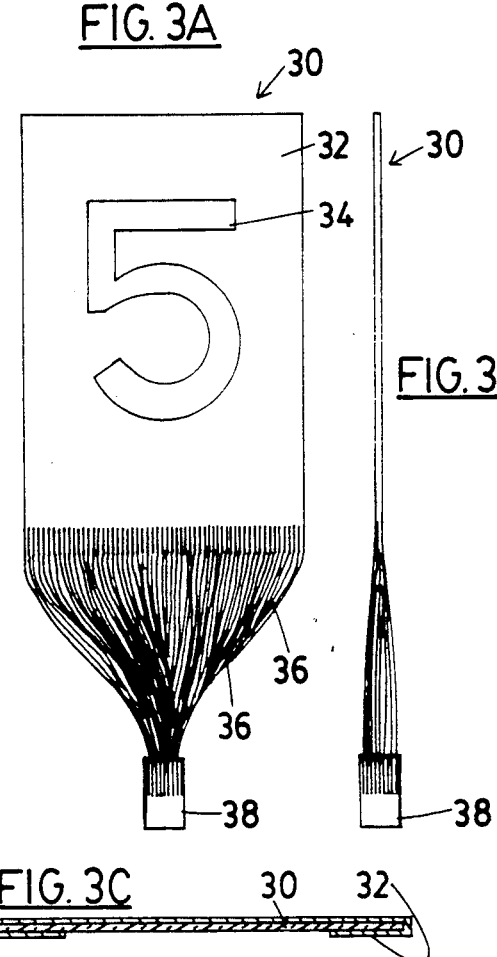
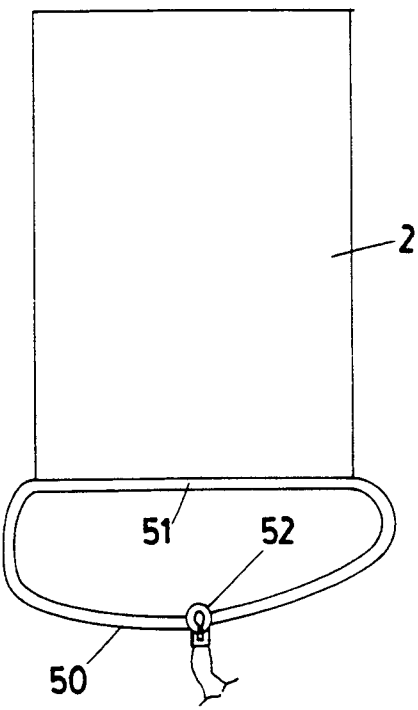
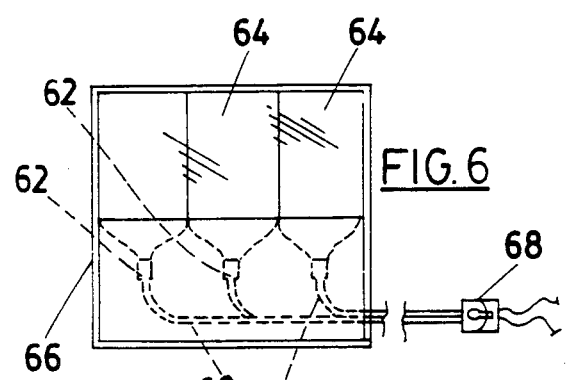
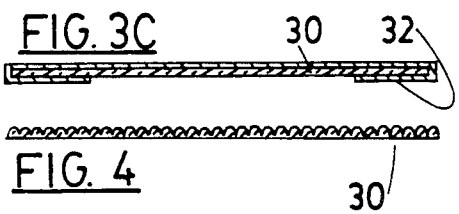
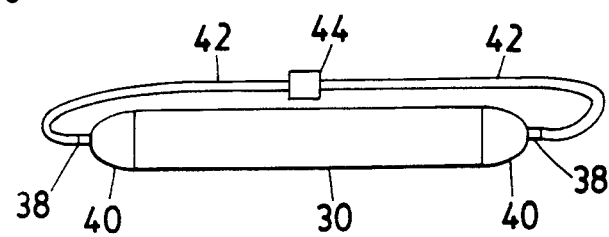

EDGE ILLUMINATED SIGN PANEL

This invention relates to edge illuminated signs of light conductive material.

It is known to provide signs comprising a panel of transparent material such as polyacrylate plastic, in which the surfaces and edges of the panel are provided with a specular coating except for an interruption in the location of a light source adjacent the edge of the panel, and for openings in the coating of the front surface of the panel providing indicia, the light entering the panel from the light source being restricted to escaping through the indicia. Such a device is disclosed in U.S. Pat. No. 2,795,069, issued Jun. 11, 1957 to Hardesty. Similar devices are utilized in the illuminated signs disclosed in U.S. Pat. No. 3,968,584 issued Jul. 13, 1976 to Kingston and U.S. Pat. No. 4,009,535 issued Mar. 1, 1977 to Stock.

A problem with such devices resides in obtaining uniform illumination of the indicia. Each of these patents discloses the use of small incandescent electric light bulbs as light sources, and successive reflections of light from such bulbs within a rectangular panel are unlikely to provide uniform intensity of light emission from different portions of the indicia. Furthermore, in solar powered signs such as that disclosed in the Stock patent, it is essential to keep the consumption of electrical energy by the sign as low as possible, which means that the use of multiple bulbs to provide more uniform illumination is not really practicable, and even a single bulb may require a considerable area of photovoltaic cells to provide sufficient energy to maintain illumination during the hours of darkness if the sign is to be powered continuously. An additional problem with some such signs, when higher powered bulbs are utilized, is that the material of the sign may be locally overheated, leading to distortion, warping or discolouration of the material of the sign.

Objects of the present invention are to provide edge illuminated sign panels which are capable of providing more uniform illumination of sign indicia, which are capable of operation with reduced energy requirements, and which can be operated in conjunction with relatively high powered light sources without local overheating problems.

According to the invention, an edge illuminated sign panel unit incorporates light guide means of transparent material having one end in light conductive connection with at least a major portion of one elongated edge of at least one edge illuminable panel, and the other end in light conductive communication with a light source, the cross sectional configuration of the light guide means being different at one end from the other such as to match an aperture of the light source to at least one aperture defined by said portion of said one edge of each panel. The light guide means may be separately formed and attached to the panel, or form an integral continuation of it.

Further features of the invention will be apparent from the following description of preferred embodiments thereof.

Exemplary embodiments of the invention are illustrated in the accompanying diagrammatic drawings, in which:

FIGS. 3A, 3B and 3C are respectively front elevational, side elevational and horizontal sectional views of a modification of the second embodiment of the invention;

FIG. 4 is a horizontal sectional view of a modification of the embodiment of FIGS. 3A, 3B and 3C;

FIG. 5 is a front elevation of a further embodiment of the invention;

FIG. 6 illustrates how several panels can be illuminated by a single light source; and FIG. 7 illustrates how an elongated panel can be evenly illuminated by a single light source.

Figures 1A, 2:
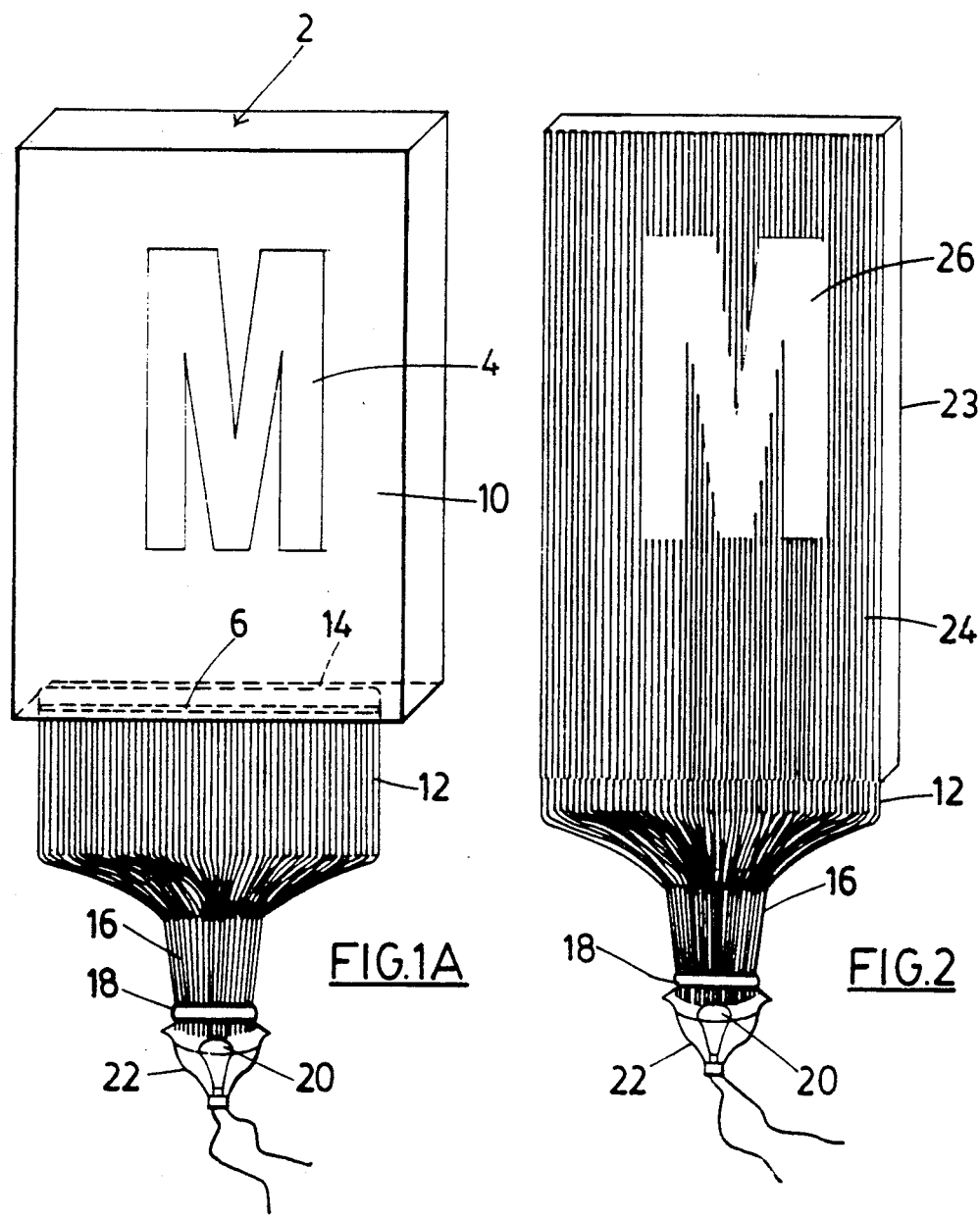
FIG. 1A is a perspective view of a first embodiment of the invention.
FIG. 2 is a perspective view of a second embodiment of the invention.
Figure 1B:
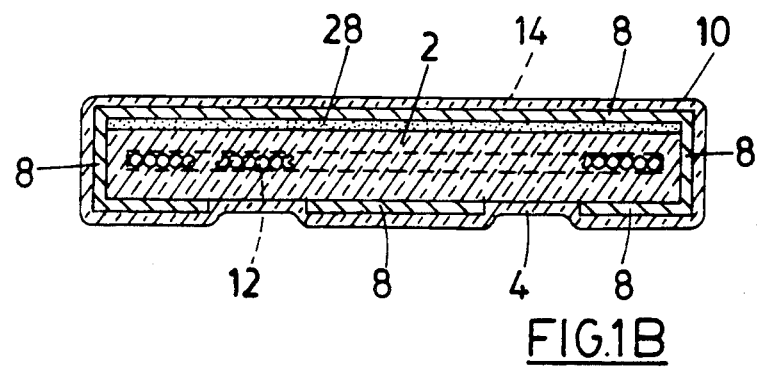
FIG. 1B is a horizontal section through the panel of FIG. 1A.

Referring first to FIGS. 1A and 1B, a panel 2 is fabricated from a sheet of glass or transparent synthetic plastic, typically a polyacrylate such as those sold under the trade marks PERSPEX and LUCITE. This sheet is covered both front and rear, and on its edge surfaces, by an internally re-emissive layer 8 except for areas 4 on one or both surfaces defining desired indicia and an elongated zone 6 on one edge surface, which in the example shown is a groove 14 in the bottom edge surface of the panel. The term "re-emissive" is used to embrace both reflective layers and phosphorescent layers which regenerate rather than reflect incident light. The layer 8 may be an internally reflective layer consisting of thin metallization applied by any suitable known technique for applying such layers to the material of the panel, e.g. vapour deposition, and may in turn be covered by a layer 10 of paint or other coating material depending upon the desired external appearance of the panel when not illuminated. If a transparent or translucent panel is desired, the layer 6 may be formed on at least one surface of the panel by transparent or translucent material of lower refractive index than the material of the panel such as to provide total internal reflection of at least most of the light from zone 6 or reflected from edge surfaces of the panels. Desired indicia may be produced by use of masks or stencils during application of the layer 8, and the layer 10 if present. Alternatively these layers may be separately formed so as to define the indicia, and subsequently applied to the panels, or the indicia may be formed after application of the layers by selective removal of the latter as by etching. However the indicia are applied, the objective is to provide portions of the surface of the panel where the original refractive index of the panel material is maintained or enhanced, so that light may escape from the panel in the areas of the indicia.

One end of a flat ribbon 12 of parallel optical fibres is coupled to the zone 6. By providing a groove 14 into which the end of the ribbon is cemented with a suitable optical cement, a secure fastening with the ends of the fibres in parallel alignment with the surfaces of the panel may be achieved. The fibres may be fabricated from plastic of high light transmissivity, and either provided with an integral cladding to prevent light loss, or bonded into a ribbon by suitable cladding materials. Such ribbons are well known in the fibre optic art. Various other forms of ribbon light guide may also be employed, as discussed below in relation to other embodiments of the invention.

The fibres of the opposite end portion of the ribbon are separated and formed into a typically circular bundle 16 by a suitable retaining collar 18. This bundle can be aligned to receive a light beam formed by an electric light bulb 20, or other light source such as a light emitting diode, in a reflector 22, or alternatively the collar may be replaced by a coupling ferrule as described further below for coupling of the device to a light guide connected to a remote light source.

For certain applications, a layer 28 of long persistence phosphorescent material may be applied to the back of the panel beneath or in place of the layer 8. This layer absorbs light energy whilst the panel is illuminated, and radiates when illumination of the panel is interrupted. Provision of such a layer permits intermittent illumination of the panel so as to economize in energy requirements or to provide special effects. For example, battery operated strobe lights using xenon discharge tubes are known which can produce regular high intensity flashes over a long period. Combined with a panel according to the invention, an effective emergency sign can be provided, possibly using a battery charged by solar cells.

FIG. 2 shows a second embodiment of the invention, in which a back panel 23, which may be transparent or opaque, is overlaid by a flat ribbon 24 of optical fibres which forms a continuation of a ribbon 12 similar to that of FIG. 1A, and to which light is applied in a similar manner. The far ends of the fibres are provided with a reflective coating to prevent light loss, and indicia 26 are formed by selectively abrading or embossing the surface of the ribbon to form areas from which the light may escape. The embossing may conveniently be carried out using a heated die. As in the previous embodiment, a coating or layer 10 (see FIG. 1B) of protective material may be applied to the panel unit, any material covering the indicia being selected to be transparent or translucent and to have a high enough refractive index not to interfere with desired light emission. Obviously, coloured light sources or appropriately coloured materials may be utilized if a sign in colour is desired.

A modification of the embodiment of FIG. 2 is shown in FIGS. 3A, 3B and 3C. In this case, the ribbon 24 is replaced by a thin sheet or panel 30 of transparent synthetic plastic having high transmissivity, the surface of which is covered by a layer 32 of metallization or material of lower refractive index except in the areas of indicia such as 34. The sheet may or may not be mounted on a backing panel, not shown. An extension from one edge of the sheet 30, in this case the lower edge, is shredded into a large number of parallel strips 36 the ends of which are gathered and cemented into a ferrule 38 which may be utilized to couple the unit to a light source or to a light guide communicating with a light source. In a variation (see FIG. 7), suitable for an elongated panel, extensions 40 from both ends of the panel are shredded, and the associated ferrules 38 connected by plastic light guides 42 to a single light source 44.

In order to facilitate fabrication and further control unwanted light losses, the sheet 30 may be extruded as a ribbon with a fluted construction and only minimal connection between adjacent flutes. Such a sheet may be extruded with an integral cladding layer to inhibit light loss, and this layer will substantially maintain its integrity when the flutes are separated. Such a construction is shown in FIG. 4.

A further method for coupling a light guide to a panel, otherwise as described in FIG. 1, is shown in FIG. 5. In this instance a length of light guide 50 having an appropriate internally reflecting cladding has a flat cut on one side 51 over an intermediate portion of its length, this flat being cemented or welded to an uncoated end of the panel 2 so that light may escape from the light guide into the panel. The ends of the light guide 50 are coupled to a lamp house 52.

As shown in FIG. 6, light guides 60 may be coupled to ferrules 62 of a number of panels 64 in accordance with any of the previously described embodiments, the panels being mounted in an enclosure 66. The light guides 60 may then be coupled to a convenient light source 68 which can be located remotely from the enclosure. For example, an illuminated house number sign can derive its illumination from a separate exterior light or even a light within the house to which it is connected by light guides. Such light guides present no electrical hazard and are not subject to the electrical codes applicable to exterior wiring, thus facilitating installation. More significantly, such an arrangement is advantageous for providing illuminated signs in hazardous zones where electrical equipment is subject to special requirements to avoid any risk of explosion. A further advantage is that the heat associated with most illuminated signs is largely avoided. Most conventional light sources are extremely inefficient in converting other forms of energy into light, most of the energy consumed being converted into heat. An arrangement in accordance with the invention can be used to prevent this heat being developed in or immediately adjacent the sign.

I claim:

1. A sign panel comprising panel means transparent to light, said panel means presenting generally planar extended surfaces, and said panel means being divided at an end into multiple longitudinally extending light guiding filaments, optically continuous with said panel means; and means gathering distal ends of said filaments into at least one compact bundle for coupling to a light source of restricted aperture, wherein both the filaments and the panel means are formed from a single synthetic plastic sheet, and wherein the synthetic plastic sheet is moulded with longitudinally extending flutes with only minimal connection between the flutes, a cladding layer integral with said panel means and filaments to prevent light loss, the cladding layer covering said extended surfaces of the panel means and the filaments except for zones of at least one of said extended surfaces defining indicia in which said cladding layer is interrupted to permit the escape of light from said panel means, and the flutes being separated at said end of the panel means to form said filaments.

2. A sign panel according to claim 1, wherein a further transparent layer is provided covering at least the indicia formed by interrupting the layer covering said one extended surface, said further layer having a refractive index high enough not to interfere with light emission from the panel means.

3. A sign panel according to claim 1, wherein the means gathering the filaments is at least one ferrule.

4. A sign panel array comprising a plurality of panels according to claim 1, and further light guide means optically coupled between a remote light source and the bundles of filaments associated with said panels.

* * * * *